Nov. 25, 1941.  E. H. HECKETT  2,264,204
METHOD AND APPARATUS FOR RECLAIMING METAL
Filed Sept. 9, 1939   3 Sheets-Sheet 1

Inventor
ERIC H. HECKETT
By Francis J. Klempay
Attorney

Nov. 25, 1941.  E. H. HECKETT  2,264,204
METHOD AND APPARATUS FOR RECLAIMING METAL
Filed Sept. 9, 1939  3 Sheets-Sheet 2

Inventor
ERIC H. HECKETT
By Francis J. Klempay
Attorney

Nov. 25, 1941.                E. H. HECKETT                2,264,204
              METHOD AND APPARATUS FOR RECLAIMING METAL
                    Filed Sept. 9, 1939          3 Sheets-Sheet 3
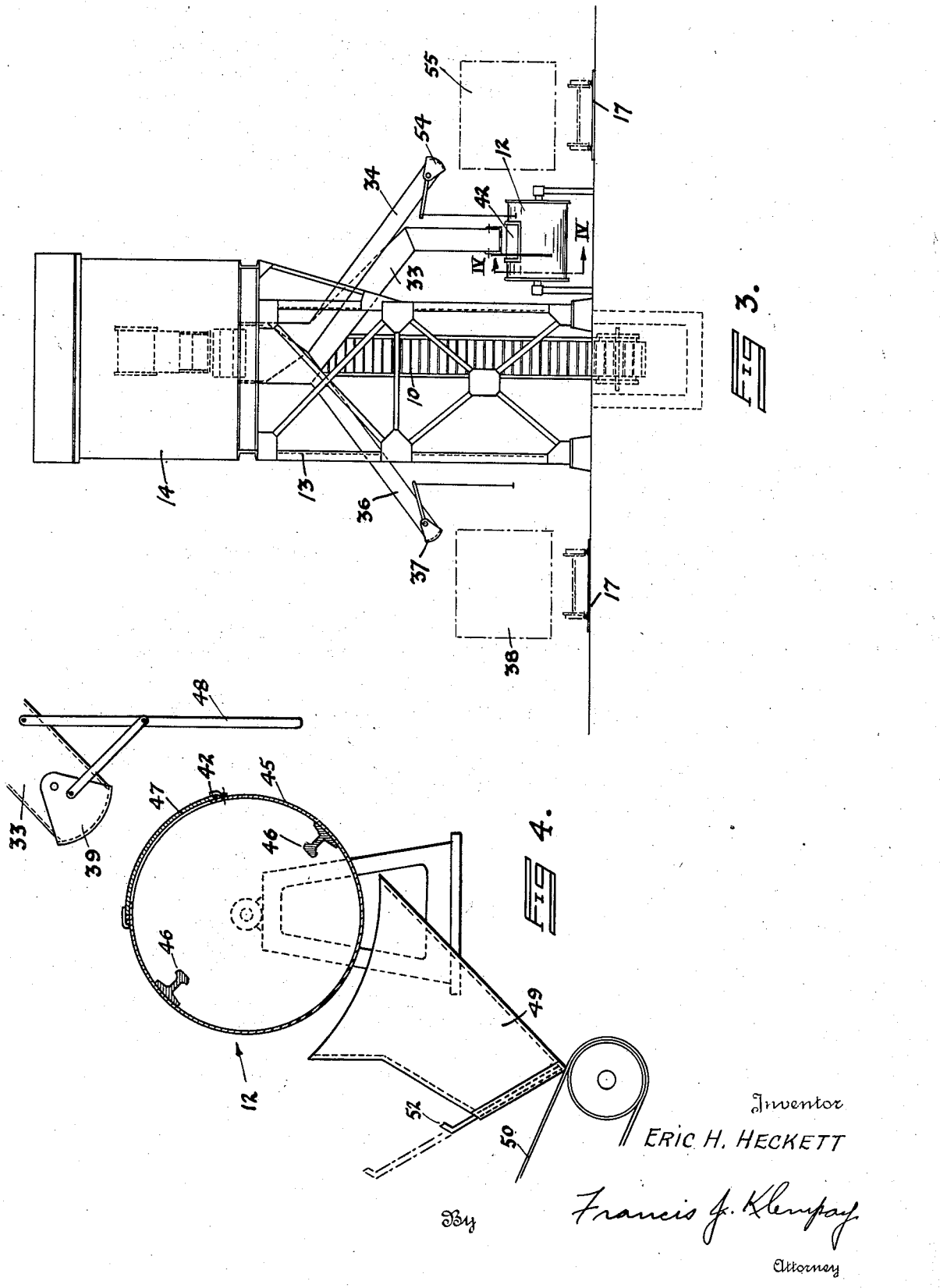
Inventor
ERIC H. HECKETT
By Francis J. Klempay
Attorney Patented Nov. 25, 1941

2,264,204

UNITED STATES PATENT OFFICE 2,264,204

METHOD AND APPARATUS FOR RECLAIMING METAL

Eric H. Heckett, Cleveland, Ohio

Application September 9, 1939, Serial No. 294,150

8 Claims. (Cl. 209—214)

This invention relates to a method and apparatus for reclaiming metal from open hearth slag and more particularly to an improved method of handling, separating and breaking up the combined slag and steel particles and to an improved plant layout generally and to improvements in certain elements of the plant utilized in carrying out the method whereby substantial economies in the operation of the process are effected to an extent sufficient that profitable exploitation of the process is possible.

In the tapping off of the slag from an open hearth furnace considerable steel is entrapped and flows off with the slag and upon solidification the steel forms into irregular shapes and is substantially wholly encased in the solidified slag. Due to the irregularities in the size and shape of the encased steel pieces and the variation in the composition and hardness of the steel, it is impractical to employ conventional crushing equipment to reduce the particles sufficiently to enable the same to be separated by conventional separation equipment. In accordance with the present invention the slag and the entrapped steel is broken up by an impact method and then passed through a magnetic separator, the functional characteristics of which are correlated with the sizes of the particles supplied thereto, which separation divides the slag particles having a substantial percentage of steel entrapped therein from the slag particles substantially free of entrapped steel. Thereafter the first mentioned particles are subjected to a further impact treatment to break away the slag from the steel in these particles and the material so broken up is then reseparated by the magnetic separator aforementioned into steel particles substantially free of slag and slag particles substantially free of steel. The steel so recovered is suitable for recharging into an open hearth or for charging a cupola and for other purposes.

It is, therefore, the primary object of the invention to provide an improved method and plant for the recovery of usable steel from the slag refuse of an open hearth furnace.

The above and other objects and advantages of the invention will become apparent from a consideration of the following detailed specification and the accompanying drawings wherein there are specifically disclosed preferred embodiments of the invention.

Referring to the drawings:

Figure 3 is an end view of the apparatus of Figure 1; and

Figure 4 is a sectional view through a material impacting device utilized in the process to loosen the slag from the steel particles after the first separation of particles from the wholly slag particles.

Figure 1:
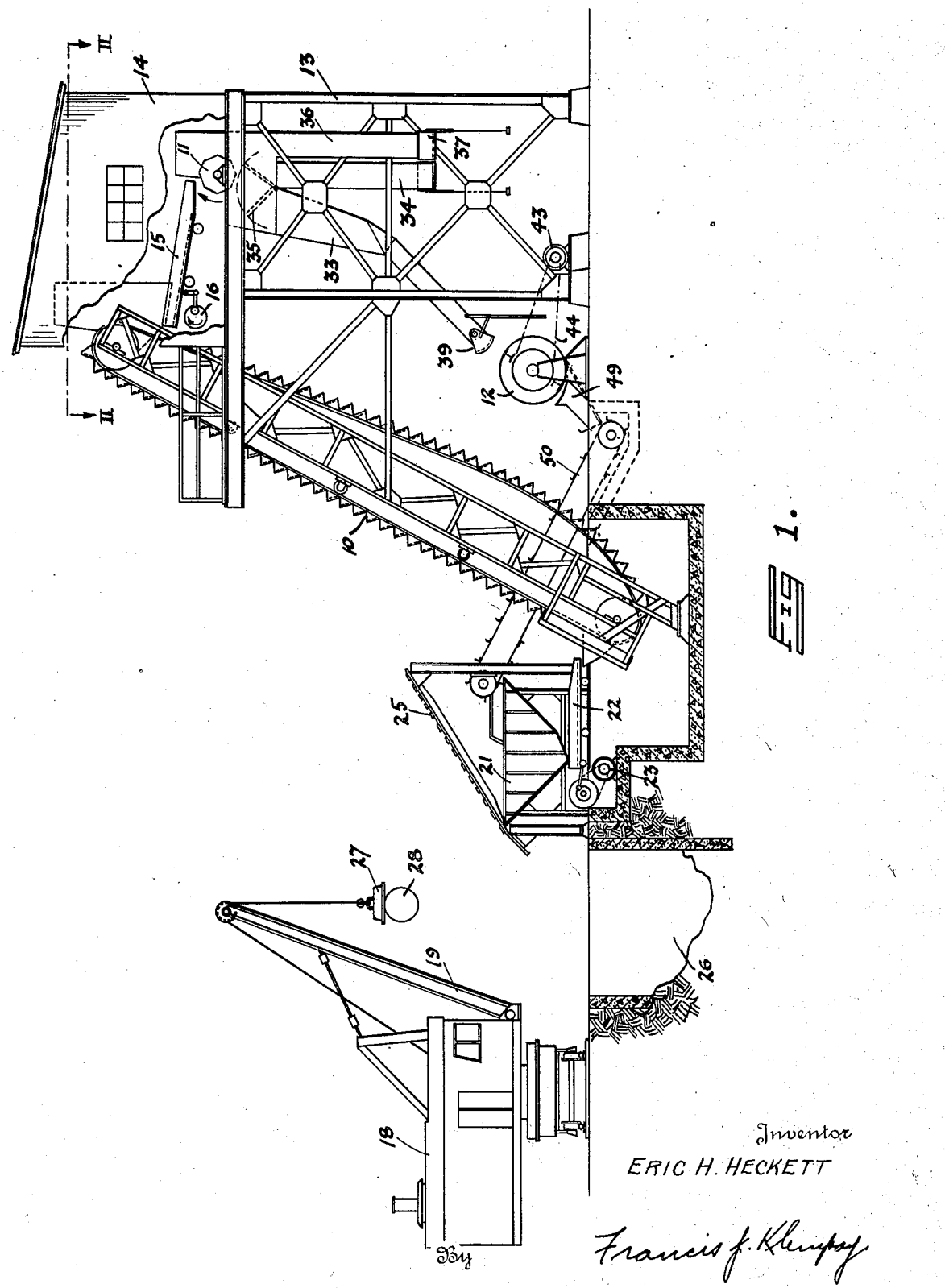
Figure 1 is an elevational view of the preferred apparatus employed in carrying out the method of the present invention.

Referring now to the drawings, the preferred construction and layout of the plant utilized in carrying out the process of the invention consists generally of a chain bucket elevator 10 for hoisting the materials from which the iron and steel is to be recovered to a magnetic separator 11, a tumbler drum 12 and various other means to be hereinafter specifically pointed out for conveying and processing the materials involved. Magnetic separator 11 is supported at the top of a tower 13 and is provided with a suitable enclosure 14. A shaker feeder 15 actuated by a revolving crank 16 is employed to shift the material deposited by the elevator 10 onto the magnetized surfaces of the separator 11.

A rail line 17 is positioned on either side of the tower 13 and adjacent thereto for the purpose of conveying the materials to and from the plant and a crane 18, provided with a boom 19 and preferably movably mounted on rails 20, is employed to handle the materials utilized in the process. Adjacent the lower end of he elevator 10 is a hopper 21 provided with an outlet at its lower end, which outlet is positioned above the receiving end of a shaker feeder 22 arranged to shift material from the hopper onto the elevator 10. In accordance with usual practice, feeder 22 may be oscillated by a motor 23 through a crank as shown.

Positioned above the hopper 21 in a plane inclined substantially 35° with the horizontal is a grizzley 25 which is essentially a heavy screen built up of heavy steel strips and having a mesh of such proportions that a particle of no larger dimension than approximately 8 inches will fall through the screen while the larger lumps will roll off the same.

Adjacent the lower end of the grizzley 25 is a pit 26 adapted to receive the large particles or lumps which roll off the grizzley 25. During the operation of the plant when sufficient material has been accumulated in the pit 26 the crane 18, having the magnet 27 attached to its drag line, is employed to break up the material in the pit into smaller sized particles. This is accomplished by employing a heavy steel ball 28 which is raised to a substantial height above the material in the pit by the magnet 27 and upon deenergization of the magnet the ball falls with heavy impact onto the material in the pit, thereby breaking up the large lumps and masses into smaller particles which will pass through the screen 25.

The plant is preferably installed in the vicinity of an open hearth plant and adjacent to a storage space for slag refuse from such plant, which space is indicated on the drawings by the reference numeral 30. One of the tracks 17 leading from the open hearth plant is positioned between the space 30 and the steel reclaiming plant of the present invention and, while during normal operation of the reclaiming plant the slag is processed immediately upon its receipt from the open hearth plant, certain circumstances may result in the receipt of a larger quantity of slag than can be currently processed and in this event the excess slag is placed in storage in the space 30. The slag may be received from the open hearth plant in cars moving along the rail line 17. One of the slag loading cars is indicated schematically at 31 in the drawings as being positioned opposite the grizzley 25 and in practice the crane 18, now provided with a grab bucket in place of the magnet 27, may be employed to transfer the slag from the car or from the storage space 30 onto the grizzley 25. The slag, as received from the open hearth plant, is normally of such granulation that most of the same will pass down through the openings in the grizzley 25 and into the hopper 21, while but a small proportion of the same will be of larger sized particles and roll into the pit 26.

The slag particles having variable quantities of steel embedded therein being elevated by the elevator 10 and shifted onto the separator 11 by the feeder 15 in the manner described above, are separated by the magnetic separator 11 into two components, one component including particles having an appreciable quantity of steel embedded therein and the other component including only particles substantially free of steel. The first mentioned component, having a higher magnetic susceptibility, will have a greater length of circumferential travel on the drum 11 and will therefore be carried to a position further around the circumference of the drum before it is dropped therefrom. Referring to the assembly of Figure 1, a conduit 33 and an adjacent conduit 34 have their open tops substantially under the position of the periphery of the drum 11 from which the particles containing steel will fall and a pivotally mounted baffle 35 is employed to determine into which of the said ducts the material will be diverted. During initial operation of the plant the baffle 35 is moved to the right, as indicated in Figure 1, whereby the magnetic susceptible material coming off of the magnetic drum separator 11 will be diverted into the duct 33. The slag particles substantially free of steel will not be attracted to the separator 11 and will therefore fall vertically from the outer right edge of the separator, as viewed in Figure 1, and into the conveyer duct 36.

Figure 2:
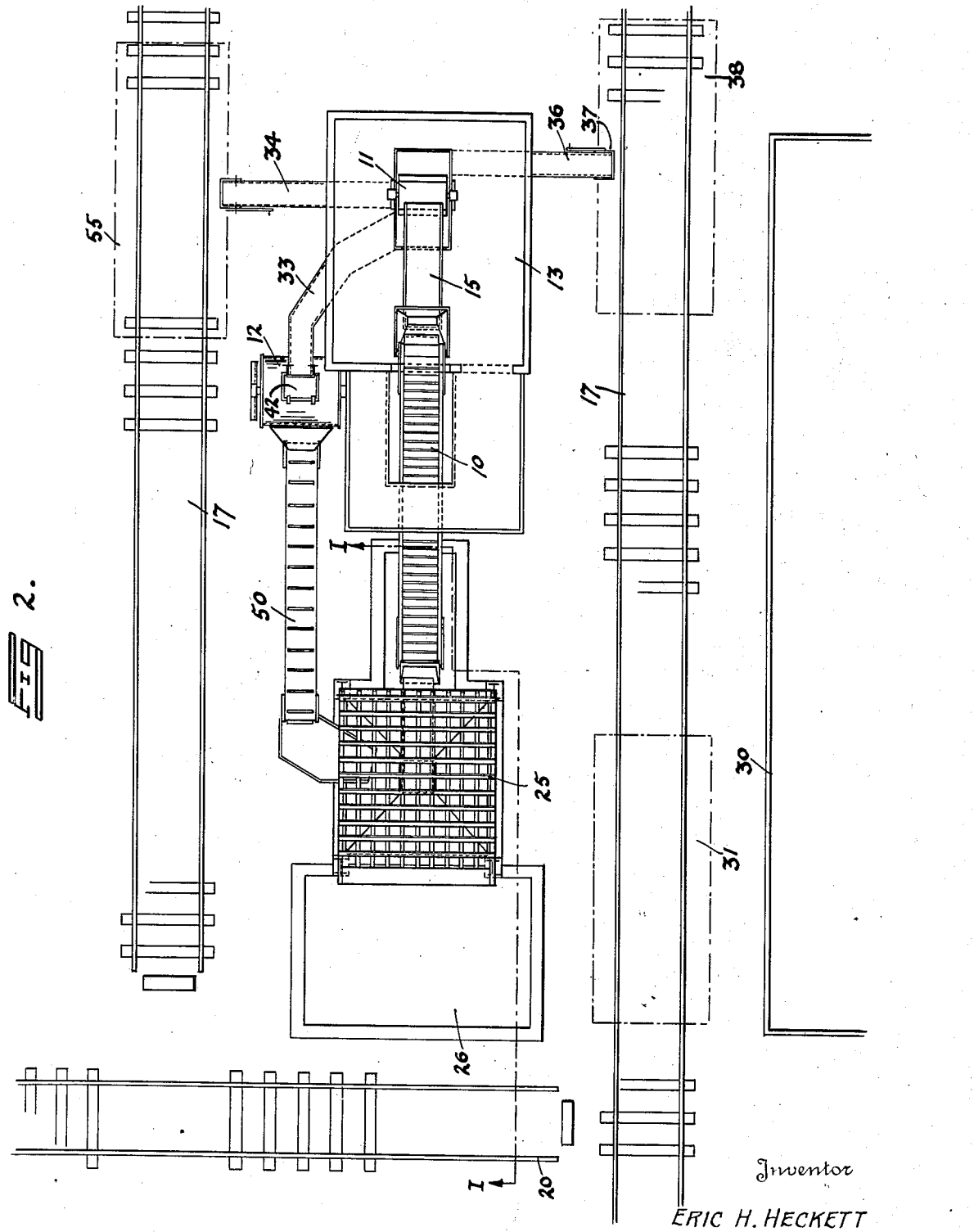
Figure 2 is a plan view of the apparatus of Figure 1.

Duct 36 extends downwardly and outwardly, as shown in Figures 1, 2 and 3 of the drawings, to a position substantially above the rail line 17 which is adjacent the storage space 30. A gate 37 is provided at the lower end of the duct 36 and the slag material coming down the duct may be loaded onto a railway car 38 or other hauling device for transportation to a place of use.

Duct 33 extends downwardly and outwardly, as shown in the drawings, and has its lower end positioned above the inlet 42 of the tumbler drum 12. The latter is operated by a motor 43 through a suitable drive 44 and, as shown more clearly in Figure 4, consists of a revolvable outer shell 45 and a pair of diametrically opposite inwardly directed rails 46 extending longitudinally of the drum. A cover 47 is provided for the opening 42 during the operation of the drum. A gate 39, manually operable by the lever 48, is provided to control the flow of materials from the duct 33.

Associated with the drum 12 and positioned underneath the same is a chute 49 adapted to guide materials from the drum 12 onto a conveyor 50 which discharges into the hopper 21. Upon initial operation of the plant thus far described the slag particles having steel embedded therein are diverted into the duct 33 and upon a sufficient accumulation in said duct a quantity of such particles are loaded into the tumbler drum 12 through the opening 42 and the drum rotated by the motor 43 in the manner aforesaid. The operation of the drum 12, which is of substantial size and capacity, is such that the rails 46 move the particles from the lower trough in said drum to substantially the upper region thereof, from which latter position the particles will fall with severe impact to the bottom of the drum, thereby loosening and breaking away the slag from the steel particles embedded therein. The material, after being treated in the drum 12 for a length of time sufficient to break away the slag from the steel, is allowed to pass into the chute 49 or other storage chamber and upon the accumulation of sufficient of such tumbler drum treated material the hopper 21 is allowed to be emptied by the cessation of the supply of raw material thereto and as the last of the raw material passes over the magnetic separator 11 the baffle 35 is moved to the left position, as viewed in Figure 1, and the gate 52 opened to allow the material accumulated in the storage chamber 49 to move onto the conveyer 50 and into the hopper 21. The treated material then follows the path of the raw materials up the elevator 10 and over the feeder 15 onto the magnetic separator 11. The steel particles which are now substantially free from slag will be brought around by the separator 11 and dropped into the duct 34 or onto the baffle 35 from which they will slide into the duct 34 and the slag component of the treated material will be diverted into the duct 36 as before. Duct 34 provided with a gate 54 at its lower end may conveniently extend to above one of the rail lines 17 so that the steel reclaimed may be loaded directly onto a car 55 positioned on the line. Upon completion of the separation of the material treated by the drum 12, baffle 35 is returned to its original position and raw material from either the car 31, storage 30 or the pit 26 is again supplied to the hopper 21.

It should be understood that various changes in the design and organization of the component parts of the plant may be made without departing from the scope of the invention, since the invention resides in the process generally and in such novelty as may be inherent in the general lay-out of a plant capable of performing the method as well as in certain component elements of the plant. For example, the conveyer 50 interconnecting the outlet from the drum 12 with the hopper 21 is shown, for illustration purposes, simply as a chain type of conveyer. It is apparent that a skip hoist might possibly perform the function of this conveyer more advantageously in certain circumstances. Also, it is contemplated that the broken up material emitted from the drum 12 might be transferred back to the hopper 21 by a drag line bucket of one of the traveling cranes normally associated with a plant of the character involved. For this purpose a storage pit may be placed adjacent the outlet of the drum 12 or the chute 49 and when sufficient material has accumulated in the pit the material may be transferred to the hopper 21 in the manner indicated.

It should now be apparent that the invention provides a practical method and plant for recovering steel scrap of commercially usable quality from steel-making furnace slag. Furnace refuse which has heretofore been considered as total waste can be profitably processed by following the principles of the invention. The invention provides an economically feasible method for accomplishing this object which method resides principally in the employment of an impact treatment for breaking away the slag from the steel particles as an intermediate step in the magnetic separations. The specific plant arrangement utilized will depend on the particular conditions encountered at the scene of operations. The above specifically described embodiment of the invention should therefore be considered as illustrative only and reference should be had to the appended claims in determining the scope of the invention.

What I claim is:

1. The method of recovering usable free steel lumps or particles from open hearth slag which consists of breaking up the solidified slag with the steel lumps or particles entrapped therein by impact, magnetically separating the material so broken up into particles containing steel lumps or particles and particles substantially free of steel, discarding the last mentioned particles, subjecting the particles containing steel lumps or particles to an impact treatment for the purpose of breaking away the slag from the steel and thereafter magnetically reseparating the material so treated into substantially all steel and all slag particles.

2. The method of recovering usable free steel lumps or particles from open hearth slag which consists of breaking up the solidified slag into particles having predetermined maximum dimensions, magnetically separating the material so broken up into particles containing steel and particles substantially free of steel, discarding the last mentioned particles, subjecting the particles containing steel to an impact treatment for the purpose of loosening the slag from the steel lumps or particles entrapped in the slag, and thereafter magnetically reseparating the material so treated into substantially all steel and all slag particles.

3. The method of recovering usable free steel lumps or particles from open hearth slag which consists of breaking up the solidified slag into particles having maximum dimensions of approximately eight inches, magnetically separating the material so broken up into particles containing steel and particles substantially free of steel, discarding the last mentioned particles, subjecting the particles containing steel to an impact treatment for the purpose of loosening the slag from the steel lumps or particles embedded in the slag and thereafter reseparating the material so treated into substantially all steel and all slag particles.

4. The method of recovering usable free steel particles from open hearth slag which consists of breaking up the solidified slag by impact into particles having maximum dimensions of approximately eight inches, magnetically separating the material so broken up into particles containing steel and particles substantially free of steel, discarding the last mentioned particles, subjecting the particles containing steel to an impact treatment for the purpose of loosening the slag from the free steel particles embedded in the slag and thereafter reseparating the material so treated into substantially all steel and all slag particles.

5. A plant installation for recovering usable free steel particles from open hearth slag comprising an elevated magnetic separating device, an elevator for hoisting the slag to said device, a tumbler drum positioned below said separating device and connected below said device with a material chute, a slag duct extending downwardly from a position immediately below said separating device, a duct adapted to receive steel particles extending downwardly from immediately below said device and a movable baffle below said device operable to divert particles acted on by said separating device and containing steel into either said chute or said last mentioned duct.

6. The method of recovering usable free steel lumps or particles from steel-making furnace slag which consists of selecting lumps or particles of such slag which are of a handleable size and magnetically separating the same into components rich and deficient in steel content, discarding the last mentioned component, subjecting the lumps or particles rich in steel to an impact treatment for the purpose of loosening the slag from the free steel lumps or particles embedded therein, and thereafter magnetically reseparating the treated material into substantially all steel and all slag lumps or particles.

7. A plant installation for recovering usable steel scrap from steel-making furnace slag comprising in combination means to convey the slag from the steel-making furnace, means to transfer the slag from said conveying means to a magnetic separating device which is operative to separate the slag into particles containing steel and particles substantially free of steel, means to convey said last mentioned particles away from said plant, apparatus for subjecting said particles containing steel to violent impacts for the purpose of breaking away the slag from the steel, and means to transfer the last mentioned particles from said apparatus to said separating device.

8. A plant installation for recovering usable steel scrap from steel-making furnace slag comprising in combination a magnetic separating device which is operative to separate the slag into particles containing steel and particles substantially free of steel, a tumbler drum adapted to receive the first mentioned particles from said device and to subject the same to violent impacts for the purpose of breaking away the slag from the steel, and means to transfer the material treated by said tumbler drum to the separating device whereby the steel pieces may be separated from the slag broken therefrom.

ERIC H. HECKETT.